United States Patent Office 3,652,590
Patented Mar. 28, 1972

3,652,590
4-BROMO AND CHLORO-4'-TERTIARY AMINO-ALKOXY BIPHENYLS
Frederick Louis Bach, Montvale, John Claire Barclay, New York, and Elliott Cohen, Pearl River, N.Y., assignors to American Cyanamid Company, Stamford, Conn.
No Drawing. Continuation-in-part of application Ser. No. 595,359, Nov. 18, 1966, which is a continuation-in-part of application Ser. No. 427,094, Jan. 21, 1965, which in turn is a continuation-in-part of application Ser. No. 370,044, May 25, 1964. This application Jan. 12, 1968, Ser. No. 697,294
The portion of the term of the patent subsequent to Mar. 26, 1985, has been disclaimed
Int. Cl. C07d 27/04
U.S. Cl. 260—326.5 M       4 Claims

ABSTRACT OF THE DISCLOSURE

This disclosure describes compounds of the class of 4-substituted-4'-tertiary aminoethoxy biphenyls, useful as hypocholesteremic agents.

CROSS REFERENCE TO RELATED APPLICATIONS

This application is a continuation-in-part of our copending application, Ser. No. 595,359, filed Nov. 18, 1966, now abandoned, which in turn is a continuation-in-part of our application, Ser. No. 427,094, filed Jan. 21, 1965, now abandoned, which in turn is a continuation-in-part of our application, Ser. No. 370,044, filed May 25, 1964, now abandoned.

BRIEF SUMMARY OF THE INVENTION

This invention relates to certain novel 4-substituted-4'-tertiary aminoethoxy biphenyls and, more particularly, is concerned with novel compounds which may be represented by the following general formula:

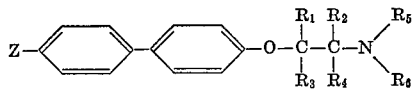

wherein Z is chloro or bromo; $R_1$, $R_2$, $R_3$ and $R_4$ are each hydrogen, methyl or ethyl with the proviso that the total number of carbon atoms in the alkylene group is less than 7; $R_5$ is lower alkyl; $R_6$ is lower alkyl; and $R_5$ and $R_6$ when taken together with the associated N(itrogen) atom is pyrrolidino or piperidino. Lower alkyl groups contemplated by the present invention are those having from 1 to 4 carbon atoms such as, for example, methyl, ethyl, n-propyl, isopropyl, n-butyl, etc.

DETAILED DESCRIPTION OF THE INVENTION

The organic bases of this invention form non-toxic, acid-addition and quaternary ammonium salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. Quaternary ammonium salts may be formed by reaction of the free bases with a variety of organic esters of sulfuric, hydrohalic and aromatic sulfonic acids. The organic reagents employed for quarternary ammonium salt formation are preferably lower alkyl halides. However, other organic reagents are suitable for quaternary ammonium salt formation, and may be selected from among a diverse class of compounds including benzyl chloride, phenethyl chloride, naphthylmethyl chloride, dimethyl sulfate, methyl benzenesulfonate, ethyl tolenesulfonate, allyl chloride methallyl bromide and crotyl bromide. For purposes of this invention the free bases are equivalent to their non-toxic acid-addition and quaternary ammonium salts.

The novel compounds of the present invention are, in general, white to tan solids which may be purified by crystallization from common organic solvents such as ether, acetone, benzene and the like. They are generally insoluble in water, but relatively soluble in organic solvents such as lower alkanols, esters, ethers, ketones, benzene, toluene, chloroform, and the like. The acid-addition and quaternary ammonium salts of the organic bases of the present invention are, in general, crystalline solids, relatively soluble in water, methanol and ethanol, but relatively insoluble in non-polar organic solvents such as ether, benzene, toluene and the like.

The novel compounds of the present invention may be readily prepared by the interaction of the sodium or potassium salt of a 4-substituted-4'-hydroxybiphenyl with an appropriately substituted tertiary aminoalkyl halide as set forth in the following reaction scheme:

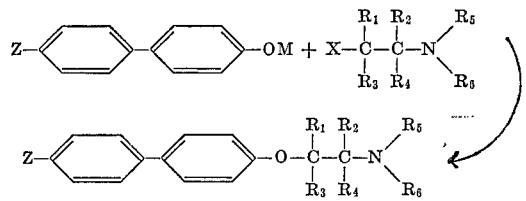

wherein M is sodium or potassium, X is halogen, and Z, $R_1$, $R_2$, $R_3$, $R_4$, $R_5$ and $R_6$ are as hereinabove defined. This reaction is preferably carried out in a solvent such as a lower alkanol, dioxane, tetrahydrofuran, toluene, and the like, at temperatures ranging from about 80° C. to about 140° C. over a period of time ranging from about 1 hour to 15 hours or more.

The novel compounds of the present invention may also be prepared by the interaction of a 4-substituted-4'-hydroxybiphenyl with an appropriately substituted tertiary aminoalkanol using N,N'-dicyclohexylcarbodiimide as a condensing agent as set forth in the following reaction scheme:

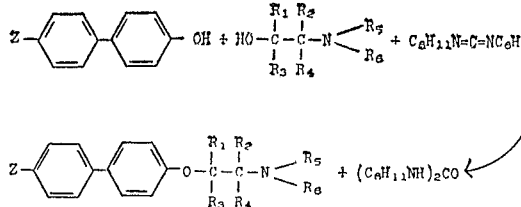

wherein Z, $R_1$, $R_2$, $R_3$, $R_4$, $R_5$ and $R_6$ are as hereinabove defined. This reaction is preferably carried out by placing the reactants, without a solvent, in a sealed tube at a temperature of about 100° C. for a period of time ranging from about 15 hours to about 48 hours.

The novel compounds of the present invention are potent hypocholesteremic agents and were shown to possess hypocholesteremic activity as determined by animal experiments as follows. The compounds studied were administered orally admixed with the diet to groups of 4 male rats, CFE strain from Carworth Farms. Control groups were maintained on the diet alone; test groups were maintained on the diet pus the indicated percentage of compound by weight. After 6 days the animals were sacrificed and serum cholesterol concentrations in milligrams per 100 milliliters were determined either (1) according to the saponification and extraction method of Trinder, Analyst 77, 321 (1952) and the colorimetric determination of Zlatkis et al., J. Lab. Clin. Med. 44, 486

(1953) or (2) by the extraction method of Leffler, Amer. J. Clin. Path. 31, 310 (1959) and the colorimetric determination of Zlatkis et al. (vide supra); the overall method appropriately modified for use in an automatic mechanical analyzer. In this test a compound is considered active if it depresses serum cholesterol 15% or more below that of the controls. In a representative operation, and merely by way of illustration, the following compounds of the present invention were shown by this test to lower the cholesterol level in blood serum as set forth in Table I below:

TABLE I

| Compound | Percent compound in diet | Percent cholesterol lowering from control group |
|---|---|---|
| 4-bromo-4'-(2-pyrrolidinoethoxy)biphenyl | 0.01 | 73 |
| 4-chloro-4'-[(2-dimethylamino-1,1-dimethyl)ethoxy]biphenyl | 0.03 | 48 |
| 4-bromo-4'-(2-diethylaminoethoxy)biphenyl hydrochloride | 0.05 | 70 |
| 4-chloro-4'-[(2-dimethylamino-2,2-dimethyl)ethoxy]biphenyl | 0.03 | 49 |

The novel compounds of the present invention may be orally administered either as the free base or as a non-toxic acid-addition or quaternary ammonium salt thereof. In addition to admixture with the diet, these compounds may be orally administered with an inert diluent, or they may be enclosed in hard or soft gelatin capsules, or they may be compressed into tablets. The amount of a single dose or of a daily dose to be given to lower blood chloesterol should be such as to give a proportionate donsage of from about one milligram to about 30 milligrams per kilogram of body weight per day.

The following examples are given solely for the purpose of illustration and are not to be construed as limitations of this invention, many apparent variations of which are possible without departing from the spirit or scope thereof.

EXAMPLE 1

A suspension consisting of 0.4 g. of sodium hydride (50.9% active in mineral oil suspension), 2.1 g. of 4-bromo-4'-hydroxybiphenyl and 50 ml. of dry toluene was refluxed 1–2 hours. To the sodio derivative of 4-bromo-4'-hydroxybiphenyl was added 1.4 g. of N,N-diethyl-2-chloroethylamine and the reaction mixture was refluxed for an additional 90 hours. After cooling, the suspension was filtered, the clear filtrate concentrated to a solid residue, and the crude product dissolved in 200 ml. of ether. The ethereal extract was decolorized with charcoal, dried over anhydrous sodium sulfate and treated with dry hydrogen chloride. The desired monohydrochloride of 4-bromo-4'-(2-diethylaminoethoxy)biphenyl separated as a white, granular precipitate; melting point 198–199° C.

EXAMPLE 2

A mixture consisting of 6.8 g. of 4-bromo-4'-hydroxybiphenyl, 4.2 g. of 2-dimethylamino-2-methyl-1-propanol and 6.8 g. of N,N'-dicyclohexylcarbodiimide were heated in a sealed tube for 8–20 hours at approximately 100° C. After cooling, the semi-solid residue was dissolved in ether, separated from the insoluble N,N'-dicyclohexylurea by filtration and the etheral filtrate concentrated to a crude isomeric mixture. The crude isomers so obtained were resolved by partition chromatography and their structures verified by nuclear magnetic resonance. Using this method both 4 - bromo-4'-[(2-dimethylamino-2,2-dimethyl) ethoxy]-biphenyl and 4-bromo-4'-[(2-dimethylamino-1,1-dimethyl)-ethoxy]biphenyl could be isolated from the same reaction mixture.

EXAMPLE 3

Employing the procedure described in Example 2, 5.4 g. of 4-chloro-4'-hydroxybiphenyl, 4.2 g. of 2-dimethylamino-2-methyl-1-propanol and 6.8 g. of N,N'-dicyclohexylcarbodiimide were heated in a sealed tube for 48 hours at 100° C. The desired isomers, 4-chloro-4'-[(2-dimethylamino-1,1-dimethyl)-ethoxy]biphenyl and 4-chloro-4'-[(2-dimethylamino - 2,2 - dimethyl)ethoxy]biphenyl were isolated using a column packed with Celite and a methyl Cellosolve-n-heptane solvent system.

EXAMPLE 4

A suspension consisting of 39 g. of the sodio derivative of 4-bromo-4'-hydroxybiphenyl and 15 g. of N-(2-chloroethyl)pyrrolidine in 600 ml. of toluene and 400 ml. of n-amyl alcohol was refluxed for 41 hours and then filtered hot. The clear filtrate was concentrated to a semi-solid residue which was triturated with three 100-ml. portions of water. The solid remaining was taken up in ether, decolorized with charcoal and dried over anhydrous sodium sulfate. Treatment of the dried ether solution with hydrogen chloride gas afforded the crude hydrochloride salt of the desired product. After dissolving the hydrochloride in approximately 200 ml. of hot water the organic base was precipitated using an excess of 10% sodium hydroxide solution. The water insoluble material was recrystallized twice from benzene yielding the desired 4-bromo-4'-(2-pyrrolidinoethoxy)biphenyl; M.P. 105–106° C.

What is claimed is:

1. A compound selected from the group consisting of 4-bromo-4'-(2-pyrrolidinoethoxy)biphenyl and the non-toxic acid-addition and quaternary ammonium salts thereof.

2. A compound selected from the group consisting of 4-chloro - 4' - [(2 - dimethylamino - 1,1 - dimethyl)ethoxy] biphenyl and the non-toxic acid-addition and quaternary ammonium salts thereof.

3. A compound selected from the group consisting of 4-bromo-4'-(2-diethylaminoethoxy)biphenyl and the non-toxic acid-addition and quaternary ammonium salts thereof.

4. A compound selected from the group consisting of 4 - chloro - 4' - [(2 - dimethylamino - 2,2 - dimethyl)ethoxy]biphenyl and the non-toxic acid-addition and quaternary ammonium salts thereof.

References Cited

UNITED STATES PATENTS 2,935,439    5/1960    Wright et al. _____ 260—570.7
3,375,256    3/1968    Bach et al. _____ 260—570.7

OTHER REFERENCES

J. Med. Pharm. Chem., vol. 1, pp. 121 and 131 (1959), Yale.

HENRY R. JILES, Primary Examiner

S. D. WINTERS, Assistant Examiner

U.S. Cl. X.R.

260—570.7, 293.83, 293.73, 620, 553 R, 566 R; 424—274, 330